Nov. 28, 1961      I. REINGOLD      3,011,134
MICROWAVE DUPLEXER
Filed Oct. 27, 1959
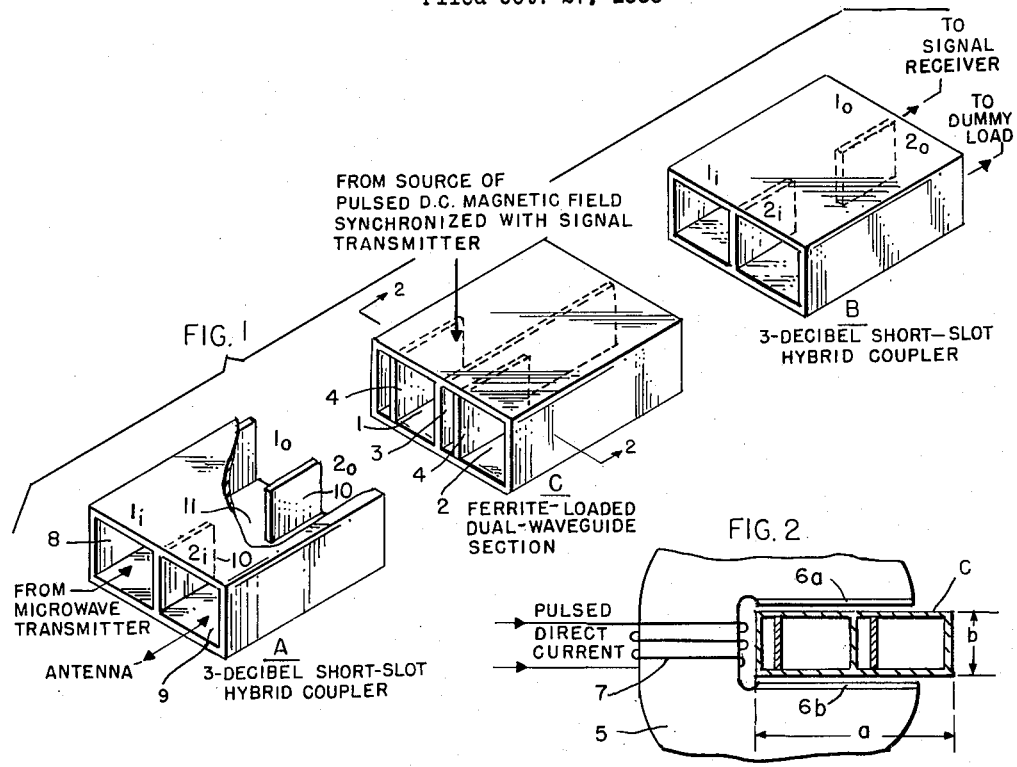
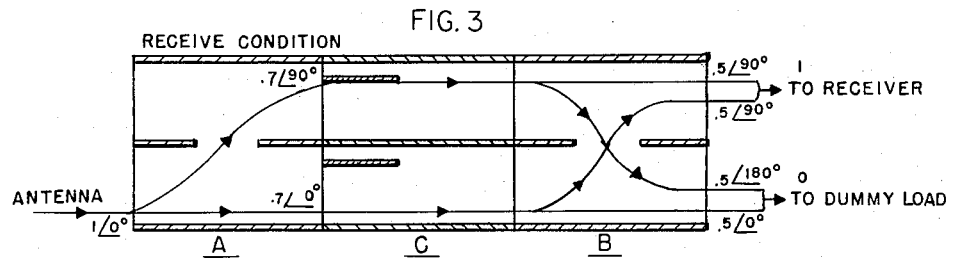
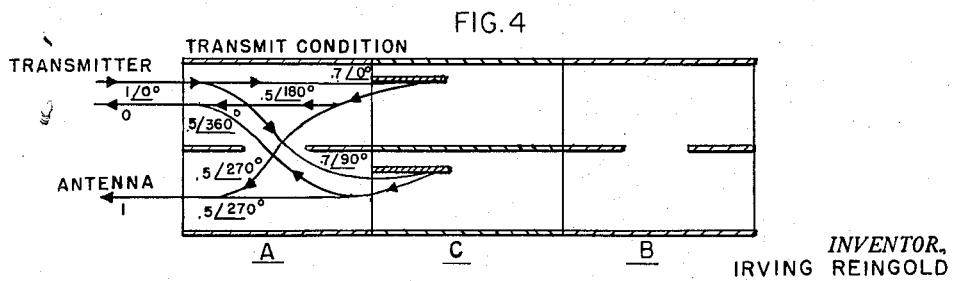
INVENTOR,
IRVING REINGOLD
BY Harry M. Saragovitz
ATTORNEY.

United States Patent Office 3,011,134
Patented Nov. 28, 1961

3,011,134
MICROWAVE DUPLEXER
Irving Reingold, West Deal, N.J., assignor to the United States of America as represented by the Secretary of the Army
Filed Oct. 27, 1959, Ser. No. 849,124
1 Claim. (Cl. 333—7)
(Granted under Title 35, U.S. Code (1952), sec. 266)

The invention described herein may be manufactured and used by or for the Government for governmental purposes, without the payment of any royalty thereon.

The invention relates in general to microwave signal transmission systems, and particularly to duplexing equipment for use in microwave radar or similar two-way radio communication sets or systems employing a common transmitting and receiving antenna, for directionally controlling signal transmission therein.

It is more specifically directed to such duplexing equipment of the balanced type for conditioning the associated radar or two-way radio device alternately for signal transmitting and signal receiving at the same microwave frequency.

General objects of the invention are to provide an improved microwave duplexer of this type which is small, compact and simple in construction; requires no gas-filled or other electronic discharge tubes as main control elements and therefore has a relatively long useful life; operates positively and efficiently; and has improved timing characteristics.

Another object is to provide a simple, low-loss duplexing device of the balanced type capable of operation over a range of microwave frequencies.

A more specific object is to provide a balanced duplexer which, after it has been operated to one of its two signal conditions (signal transmitting or receiving) in response to signal waves in one direction and these controlling signal waves have been removed, will quickly return to a normal condition in which it is ready for immediate operation to the other signal condition in response to other signal waves transmitted in the opposite direction.

It is known that the critical electromagnetic wave frequency that can be propagated through a ferrite-loaded waveguide is a function of the strength of the direct current magnetic field to which the ferrite loading material is subjected. The duplexing device in accordance with the invention makes use of this principle. Broadly described, it comprises a network including a dual section of rectangular, hollow-pipe waveguide loaded in each section with an appropriate slab of ferrite material and subjected to a controlling pulsed direct current magnetic field of a given strength from an external source, connected between two like 3-decibel, short-slot hybrid couplers of the waveguide type. The microwave signal transmitter and common transmitting and receiving antenna of the associated radar or similar two-way radio communication system are respectively connected to a different one of two waveguide terminals of a first one of the hybrid couplers, and the signal receiver of this system and a suitable dummy load are respectively connected to a different one of two waveguide terminals of the second hybrid coupler, the network providing a balanced bridge connection between these four transmission elements.

With suitable synchronization of the microwave transmitter of the radar or similar system and the source producing the pulsed direct current magnetic field, during the periods in which the signal transmitter supplies outgoing signal pulse energy of microwave frequency to the ferrite-loaded waveguides through the first hybrid coupler, the cut-off frequency of these guides under control of the pulsed direct current magnetic field is made such that substantially none of the signal energy can be propagated through the waveguides but instead will be reflected back through the first hybrid coupler which provides the proper phasing of the reflected energy to channel it to the associated antenna for radiation thereby. During the intermediate intervals or receiving cycles in which incoming echoes or signal pulse energy of the same microwave frequency is picked up by the antenna and applied to the ferrite-loaded waveguides through the first hybrid coupler, since the pulsed direct current magnetic field is off during these intervals, the cut-off frequency of these guides will be the normal value which is above the signal frequency with the result that the incoming signal pulse energy will be propagated without appreciable loss through them to the second hybrid coupler which will provide the proper phasing to channel this signal energy to the associated signal receiver for detection therein.

A feature of the microwave duplexer in accordance with the invention is its rapid recovery time, that is, its quick return after each signal transmitting period of the associated system to the normal high cut-off frequency condition in which it is adapted to propagate any applied incoming signal pulse energy to the signal receiver, without the provision of any additional equipment for accomplishing this.

The various objects and features of the invention will be better understood from the following complete description thereof when it is read in conjunction with the several figures of the accompanying drawings in which:

FIG. 1 shows a perspective, exploded view of one embodiment of a balanced microwave duplexer in accordance with the invention, partially broken away to show structural details more clearly;

FIG. 2 shows a cross-sectional view of the dual ferrite-loaded waveguide portion of the duplexer of FIG. 1 at the point where the ferrite loading material is located, together with a side view of one type of electromagnet which could be used for applying the pulsed direct current magnetic field transversely thereto; and FIGS. 3 and 4 respectively show diagrams used to illustrate the operation of the microwave duplexer of the invention in the signal receiving and signal transmitting conditions.

Referring to FIG. 1, it will be seen that the duplexer in accordance with the invention includes two like end portions A and B and an intermediate portion C connected end-to-end. The intermediate portion C comprises two like adjoining straight sections 1 and 2 of rectangular, hollow-pipe waveguide having one narrow wall in common. Each section is loaded at one end with a like slab 4 of ferrite material which, as shown, may be attached to the wider faces of the guide at corresponding points near one end thereof and nearer to one narrow sidewall than to the other, and extends within the interior of the guide in a direction parallel to its longitudinal axis to the same distance from that end of the guide. Each slab 4 is preferably made from a ferromagnetic material, for example, polycrystalline ferrite material, appropriate to the operating frequency and power range of the microwave signals to be propagated over the guide when the duplexer is in use. The cross-sectional dimensions (height and width) of each of the ferrite-loaded waveguide sections 1, 2 and the dimensions of the ferrite slabs 4 therein are selected such that without any externally applied direct current magnetic field, the cut-off frequency of each guide is above the operating frequency of the associated communication system with the result that any applied signal energy of that frequency normally will be propagated through the guide without appreciable loss.

As indicated by the arrow in FIG. 1, a pulsed direct current magnetic field produced by an external source synchronized with the microwave transmitter of the associated radar system is applied transversely to the ferrite-loaded waveguide sections 1, 2 at points opposite the ferrite slabs 4. One arrangement which might be used for supplying this transverse direct current magnetic field is illustrated in FIG. 2. As shown, it comprises an electromagnet or solenoid comprising a horseshoe-shaped magnetic core 5 having two pole pieces 6a and 6b separated by a gap sufficiently wide to accommodate the narrow dimension b of the cross-section of the ferrite-loaded waveguides 1, 2 which are mounted to extend longitudinally through this gap, and located directly opposite the ferrite slabs 4 therein, and a winding 7 on this core supplied with direct current pulses of the required amplitude from a suitable direct current source. The field strength may be made of the desired value by adjusting the amplitude of the direct current supplied to the winding 7 by any available means.

Each of the end portions A, B of the duplexer comprises an identical directional coupler which is a conventional broad-band short-slot hybrid junction of the quadrature type, such as illustrated and described in the article entitled, "The Short-Slot Hybrid Junction" by Henry J. Riblet in the February 1952 issue of the Proceedings of the I.R.E. (pp. 180–184), vol. 40, No. 2. As shown in FIG. 1, each of these couplers comprises two straight sections 8, 9 of rectangular hollow-pipe waveguide, having the same cross-sectional dimensions as the waveguide sections 1, 2 of the intermediate portion C of the duplexer and correspondingly oriented. The waveguide sections 8, 9 have one narrow wall 10 in common having a centrally-located, longitudinally-extending slot 11 providing coupling between the two guides. The width and length of the slot 11 controls the degree of coupling between the two guides 8 and 9, the directivity and the operating frequency band. The coupling ratio is 3 decibels. As explained in the above-mentioned article, in this hybrid coupler when signal power is incident on one of its two waveguides (8 and 9) at terminal $1_i$, it proceeds along this guide until it encounters the coupling section (slot 11) which divides the signal energy between the two waveguides so that the energy leaving terminal $1_o$ of one guide just equals that leaving at terminal $2_o$ of the other guide. It should be noted that the above-mentioned article refers to the use of this type of hybrid coupler in combination with TR (gas) tubes to form a balanced duplexer. Such a duplexer inherently would have a relatively slow recovery time, or would require additional equipment to restore the tubes to the unoperated condition after they have been fired by signal energy received from the signal transmitter in order to condition the associated signal transmission system for signal reception.

Applicant's network as described above including the portions A, B and C in combination is connected at its terminals to a microwave radar or similar two-way radio system to form a balanced duplexer for producing directional control of signal transmission therein. As indicated in FIG. 1, in this system the terminal $1_i$ of hybrid coupler A is connected to the microwave transmitter or other source of radio frequency signal power, which may be a magnetron; the terminal $2_i$ of hybrid coupler A is connected to a common transmitting and receiving antenna; the terminal $1_o$ of hybrid coupler B is connected to a signal receiver; and terminal $2_o$ of hybrid coupler B is connected to a non-reflective termination or dummy load. The pulsing direct current source for producing the transverse direct current magnetic field applied to the dual ferrite-loaded waveguide section C is synchronized with the microwave pulse transmitter of the associated radar or similar radio system by any suitable means (not shown) so that the strength of the applied magnetic field would be zero in signal receiving intervals, the ferrite-loaded waveguides 1 and 2 being proportioned and designed so that the frequency cut-off of each would be above the signal frequency during these intervals. During signal transmitting intervals, the strength of the D.-C. magnetic field applied transversely to the ferrite-loaded waveguides, for example, by suitably selecting the amplitude of the direct current pulses applied to the winding 7 of the electromagnet (FIG. 2), is made sufficient to bias the ferrite material in the slabs 4 to change the frequency cut-off of each of the waveguide sections 1, 2 to a value below the signal frequency.

The operation of the balanced duplexer of the invention as shown in FIG. 1 will now be described with reference to the diagrams of FIGS. 3 and 4 respectively indicating by the arrowed straight and curved lines the distribution of the signal energy produced by the duplexer in the signal receiving and signal transmitting conditions, respectively, of the associated radar or similar two-way radio signaling system.

The operation of the duplexer of FIG. 1 during signal receiving intervals of the associated radar or similar microwave radio signaling system will be described first. The incoming echo or radio pulse energy of microwave frequency picked up by the antenna of the system during such intervals will be applied to the waveguide portion 9 of hybrid coupler A at its input terminal $2_i$ and will be propagated over that portion to the coupling section thereof (slot 11) where it will be divided into two equal energy portions. As illustrated at the left of the diagram of FIG. 3, one of these energy portions will pass straight through waveguide 9 to its output terminal $2_o$, and the other portion lagging the first portion by 90 electrical degrees will cross over to the waveguide 8 and pass over it to the output terminal $1_o$. The two incoming energy portions will be respectively delivered to the waveguides 1 and 2 of the dual ferrite-loaded waveguide section C. As the strength of the transverse D.-C. magnetic field applied to the member C is zero during signal receiving intervals, each of its ferrite-loaded waveguides 1 and 2 will have a cut-off which is above the signal frequency. Therefore, as indicated at the center of the diagram of FIG. 3, the two applied signal energy portions will be propagated without appreciable loss directly through the waveguides 1 and 2 of the member C to the input terminal $1_i$ of the waveguide portion 8 and the input terminal $2_i$ of the waveguide portion 9, respectively, of the hybrid coupler B. At the coupling section (slot 11) of member B, as indicated at the right in the diagram of FIG. 3, each of the applied signal energy portions will be divided into two equal energy portions having the relative phase relations shown in that figure, one of which will pass directly through the same waveguide to which it was applied to its output terminal and the other of which will cross over to the other waveguide and pass thereover to its output terminal. The relative phase relations between the two signal energy portions appearing at each of the two output terminals of hybrid coupler B, as shown in FIG. 3, are such that they will add vectorially to balance out at terminal $2_o$ connected to the dummy load, and will reinforce each other at terminal $1_o$ connected to the signal receiver. The resulting reinforced received echo or radio pulse energy will be detected in the signal receiver.

The operation of the duplexer of the invention during signal transmitting intervals of the associated signaling system will now be described with reference to the diagram of FIG. 4. The pulsed direct current magnetic field to which the ferrite slabs 4 in the dual ferrite-loaded waveguide section C are subjected is pre-pulsed just prior to the generation of each signal pulse of microwave frequency by the transmitter. The transmitter pulse energy applied to the input terminal $1_i$ of waveguide 8 of the hybrid coupler A will be split at the coupling section (slot 11) into two equal energy portions one of which passes straight through the guide 8 to the output terminal $1_o$ and the other of which will cross over to the guide 9 and pass thereover to the output terminal $2_o$. As indicated at the left in the diagram of FIG. 4, the voltage crossing over leads the voltage passing straight through by 90 electrical degrees. The strength of the transverse D.-C. magnetic field applied to the dual ferrite-loaded waveguides 1, 2 in member C during signal transmitting intervals is made sufficient to bias the ferrite material in these guides to a condition such that the cut-off frequency of each of these guides is below the signal frequency. Therefore, substantially none of the signal energy respectively applied to the inputs of the waveguides 1 and 2 from the output terminals $1_0$ and $2_0$ of hybrid coupler A will be propagated through these waveguides, but instead will be reflected at the point of location of the ferrite slabs 4 therein back into the waveguides 8 and 9, respectively, of hybrid coupler A through the terminals $1_0$ and $2_0$, respectively, of that coupler. The reflected signal energy in each waveguide portion 8 and 9 of coupler A will be divided at the slot 11 therein into two equal energy portions. One of the two portions of this reflected energy will pass directly through the waveguide portion 8 or 9 in which it originated to the associated input terminal and the other will cross over to the other waveguide portion 9 or 8 and will pass thereover to the input terminal of coupler A associated with that portion. As indicated by the arrowed lines at the left end of the diagram of FIG. 4, the relative phases of the reflected energy portions are such that the two energy portions delivered to the antenna arm reinforce each other, and the reinforced transmitted energy representing substantially all of the transmitted signal power is channeled to the associated antenna for radiation thereby.

A conventional supplementary crystal protector TR tube (not shown) designed to fire at low incident power level may be inserted in the arm of the duplexer connected to the antenna so as to short-circuit that arm during signal transmitting intervals, to protect the sensitive detector of the associated receiver from leakage power and spurious radiation. Other modifications of the duplexer system described and illustrated which are within the spirit and scope of the invention will occur to persons skilled in the art.

What is claimed is:

In combination with a two-way radio communication set including a transmitter and a receiver respectively operative to generate outgoing communication signals and to detect incoming signals of the same microwave frequency in pulse form, a common transmitting and receiving antenna and a non-reflective dummy load, a balanced duplexer comprising a dual ferrite-loaded waveguide section having four waveguide terminals, two hybrid couplers of the short-slot waveguide type, one of said hybrid couplers coupling the output of said transmitter to one waveguide terminal of said dual waveguide section and said antenna to an adjacent waveguide terminal thereof, the second hybrid coupler coupling said receiver to a third waveguide terminal of said dual waveguide section and said dummy load to the fourth waveguide terminal thereof, said ferrite-loaded waveguide comprising two hollow-pipe waveguides of rectangular cross-section having one narrow wall in common, each waveguide including a slab of ferrite material attached to the opposite wide faces of the guide at one end thereof and extending within the interior of the guide in a direction parallel to the longitudinal axis thereof to the same distance from that end, each of said ferrite-loaded waveguide sections normally having a frequency cut-off above said microwave frequency so that incoming pulse energy is propagated from said antenna through said one hybrid coupler in signal receiving intervals to said second hybrid coupler through one of said ferrite-loaded waveguides with no appreciable loss, said second hybrid coupler operating to provide proper phasing therein of the applied incoming signal energies to add them vectorially and to channel the resulting signal energy to said receiver for detection thereby during receiving intervals, and external pulsing means synchronized in operation with said transmitter for applying a biasing direct current magnetic field transversely to the ferrite loading material of said dual waveguide section in signal transmitting intervals only so that it operates to reflect the applied outgoing pulse energy back into said one hybrid coupler, and said one hybrid coupler operating to add the applied direct and reflected outgoing signal energies in phase and amplitude and channel the resulting signal energy to said antenna for radiation thereby in signal transmitting intervals.

References Cited in the file of this patent

UNITED STATES PATENTS

| | | |
|---|---|---|
| 2,586,993 | Riblet | Feb. 26, 1952 |
| 2,798,205 | Hogan | July 2, 1957 |
| 2,848,688 | Fraser | Aug. 19, 1958 |
| 2,849,685 | Weiss | Aug. 26, 1958 |
| 2,850,624 | Kales | Sept. 2, 1958 |
| 2,850,705 | Chait et al. | Sept. 2, 1958 |
| 2,890,328 | Fox | June 9, 1959 |
| 2,894,216 | Crowe | July 7, 1959 |
| 2,896,174 | Fox | July 21, 1959 |